(12) United States Patent
Shaik et al.

(10) Patent No.: US 8,380,657 B2
(45) Date of Patent: Feb. 19, 2013

(54) TECHNIQUES FOR PERFORMING ETL OVER A WAN

(75) Inventors: Sadiq Shaik, San Mateo, CA (US); Saurabh Verma, Cupertino, CA (US)

(73) Assignee: Oracle International Corporation, Redwood Shores, CA (US)

(*) Notice: Subject to any disclaimer, the term of this patent is extended or adjusted under 35 U.S.C. 154(b) by 361 days.

(21) Appl. No.: 12/562,326

(22) Filed: Sep. 18, 2009

(65) Prior Publication Data

US 2010/0082532 A1 Apr. 1, 2010

Related U.S. Application Data

(60) Provisional application No. 61/098,664, filed on Sep. 19, 2008.

(51) Int. Cl.
*G06F 7/00* (2006.01)
*G06F 17/00* (2006.01)
(52) U.S. Cl. .................. 707/602; 707/613
(58) Field of Classification Search .......... 707/602, 707/613
See application file for complete search history.

(56) References Cited

U.S. PATENT DOCUMENTS

| 5,875,446 | A | 2/1999 | Brown et al. | |
|---|---|---|---|---|
| 6,141,729 | A * | 10/2000 | Ishida et al. | 711/114 |
| 7,321,939 | B1 * | 1/2008 | Porter | 709/238 |
| 7,657,576 | B1 | 2/2010 | Norcott | |
| 7,720,804 | B2 | 5/2010 | Fazal et al. | |
| 2001/0047372 | A1 | 11/2001 | Gorelik et al. | |
| 2004/0107315 | A1 * | 6/2004 | Watanabe et al. | 711/114 |
| 2005/0038831 | A1 * | 2/2005 | Souder et al. | 707/201 |
| 2005/0223109 | A1 * | 10/2005 | Mamou et al. | 709/232 |
| 2005/0251533 | A1 * | 11/2005 | Harken et al. | 707/104.1 |
| 2005/0253739 | A1 * | 11/2005 | Hu et al. | 341/1 |
| 2006/0015521 | A1 * | 1/2006 | Howey et al. | 707/102 |
| 2007/0027904 | A1 | 2/2007 | Chow et al. | |
| 2007/0112889 | A1 | 5/2007 | Cook et al. | |
| 2008/0005713 | A1 * | 1/2008 | Singh et al. | 716/11 |
| 2008/0126552 | A1 * | 5/2008 | Berger et al. | 709/230 |
| 2008/0288937 | A1 * | 11/2008 | Waterkamp | 717/177 |
| 2009/0089078 | A1 * | 4/2009 | Bursey | 705/1 |
| 2009/0119637 | A1 * | 5/2009 | Ganapathy | 717/101 |
| 2009/0313281 | A1 | 12/2009 | Lowry et al. | |
| 2009/0319546 | A1 | 12/2009 | Shaik | |
| 2010/0036771 | A1 * | 2/2010 | Daniel et al. | 705/50 |
| 2010/0103816 | A1 * | 4/2010 | Eiro | 370/230 |

OTHER PUBLICATIONS

"Data Warehousing: ETL vs. ELT," McLean Report Research Note, Jun. 12, 2007, 4 pages, Info-Tech Research Group.
"ETL Tools, METAspectrum$^{SM}$ Evaluation," METAspectrum$^{SM}$ Market Summary, Apr. 7, 2004, pp. 1-3, META Group, Inc. Stamfod, CT.
Goodman, N., "Pentaho Data Integration: Scaling Out Large Data Volume Processing in the Cloud or on Premise," a Bayon Technologies, Inc. White Paper, 2009, pp. 1-20.
Songini, M. L., "QuickStudy: Extract, Transform and Load (ETL)," Computerworld Business Intelligence, Feb. 2, 2004, pp. 1-2, downloaded on Dec. 29, 2009 at URL: http://www.computerworld.com/s/article/print/89534/QuickStudy_ETL?taxonomyName=Data+Warehousing&taxonomyId=55.
"Hierarchical Data, Connecting Rows," Dec. 7, 2006, printed on Apr. 3, 2008, at URL: http://www.sqlsnippets.com/en/topic-10919.html, pp. 1-6.
"Hierarchical Queries," Oracle Database SQL Reference 10g Release 2 (10.2), Product No. B14200-02, Dec. 2005, pp. 9-2 to 9-7.

(Continued)

*Primary Examiner* — Phong Nguyen
(74) *Attorney, Agent, or Firm* — Kilpatrick Townsend & Stockton LLP (57) ABSTRACT

Techniques that enable data extraction, transfer, and load (ETL) operations to be performed asynchronously over communication networks including a Wide Area Network (WAN).

19 Claims, 6 Drawing Sheets

OTHER PUBLICATIONS

"Hierarchical Data, SYS_CONNECT_BY_PATH," Aug. 12, 2007, printed on Apr. 3, 2008, at URL: http://www.sqlsnippets.com/en/topic-12568.html, pp. 1-4.

Montcheuil, "Third Generation ETL: Delivering the Best Performance," What Works Publication, Nov. 2005, vol. 20, printed on Apr. 4, 2008 at URL:http://www.tdwi.org/Publications/WhatWorks/display.aspx?ID=7726, pp. 1-3.

"Setting Up Security for an Integration Project—What to Consider," An Oracle Data Integrator Technical Brief, updated Dec. 2006, copyright 2007, 5 pages.

"SYS_CONNECT_BY_PATH," Oracle Database SQL Reference 10g Release 2 (10.2), Product No. B14200-02, Dec. 2005, pp. 5-175 to 5-176.

Non-Final Office Action for U.S. Appl. No. 12/141,409, mailed on Feb. 3, 2011, 10 pages.

Final Office Action for U.S. Appl. No. 12/141,409, mailed on Aug. 15, 2011, 13 pages.

Advisory Action for U.S. Appl. No. 12/141,409, mailed on Dec. 8, 2011, 3 pages.

* cited by examiner

TECHNIQUES FOR PERFORMING ETL OVER A WAN

CROSS-REFERENCES TO RELATED APPLICATIONS

This application claims the benefit and priority under 35 U.S.C. 119 (e) of U.S. Provisional Application Ser. No. 61/098,664, filed Sep. 19, 2008, entitled TECHNIQUES FOR PERFORMING ASYNCHRONOUS ETL OVER A WAN, the contents of which are herein incorporated by reference in their entirety for all purposes.

BACKGROUND OF THE INVENTION

The present application relates to data communications, and more particularly to techniques that enable data to be transferred from a source data store to a target data store over communication networks including a Wide Area Network (WAN) using asynchronous operations.

Organizations commonly use business intelligence (BI) applications to drive their decision making. The term BI broadly refers to applications, techniques, and technologies that are used to collect, transform, and store data into a meaningful form that facilitates analysis of the data including running reports for identifying trends and data mining of the data. BI applications are generally used to gain strategic insight into an organization's operations and to make decisions based upon the insight.

BI applications include extract, transform, and load (ETL) tools that are configured to extract relevant data from a data source, perform one or more transformations on the data, and to load the transformed data into a target data store (typically a data warehouse) in a form that facilitates analysis of the data. For example, ETL tools may be used to extract relevant data from an OnLine Transaction Processing (OLTP) system, perform transformations on the extracted data to convert to a form that facilitates analysis of the data, and load the data into a data warehouse in a form that facilitates querying and analysis.

More recently, there is a move towards providing software services via a Software as a Service (SaaS) model. The SaaS model changes the roles and responsibilities between consumers of software services and providers or vendors of the services. In a SaaS model, a SaaS vendor develops and maintains the software application(s), the data used by the application, and the processing resources (e.g., servers, machines) and infrastructure needed for providing the software services. A consumer may subscribe to use software services provided by the vendor for use on the consumer's data. The consumer pays the vendor on an as-needed basis when services provided by the vendor are used. Typically, service level agreements (SLAs) are signed between consumers and SaaS vendors that ensure a specified level of performance and availability of the software services to the consumers. Since the vendor, and not the consumer, provides the resources and the infrastructure for the services, the SaaS model provides significant cost savings to the consumer.

In a SaaS model, a single software services vendor may provide services to multiple consumers who may be located remotely from the SaaS vendor. The software services are typically delivered to the consumers through web-based interfaces offered by the SaaS-BI vendor via the Internet. In a typical implementation, consumers access the software provided by the vendor remotely via a communication network such as the Internet. For example, a consumer may use a web browser executing on the consumer's system to log into the SaaS vendor's system using web interfaces provided by the vendor and access software services provided by the vendor.

With the growing popularity of the SaaS model, there is a desire to provide ETL services via the SaaS model. There are however several problems in providing ETL services using a SaaS model. In an ELT or ETL (referred to commonly as ETL) architecture, data is extracted (read) from a data source (e.g., an OLTP application database), transformed (e.g., cleansed, summarized), and then loaded (stored) in a target data store (e.g., a data warehouse). In conventional ETL systems, the data source (e.g., the OLTP system) and the target data store system (e.g., the data warehouse) are connected by a local area network (LAN). Accordingly, conventional ETL systems are architected with the expectation that the components performing the ETL operations are all connected to each other over LAN connections or reside on the same server. How to provide ETL over a WAN, as needed for the SaaS model, rather than a LAN is a non-trivial problem.

Further, in conventional ETL systems, all the ETL operations are performed in a synchronous manner and as a result have to be carefully synchronized. For example, a typical traditional ETL system comprises an active source data store (e.g., an OLTP server), an active target data store (e.g., a data warehouse or a data mart), and an ETL server coupled to each other via LAN connections. Conventional ETL operations are facilitated by several processes executed by the source data store, the ETL server, and the target data store. These processes have to work synchronously to achieve the ETL operations. For example, a process (P1) executes on the source data store and computes the result of a correlated query on the source data and feeds the resulting data extracted from the data files on the source data store to the ETL server. A process (P2) executing on the ETL server communicates with the active source data store and reads the data extracted by process P1. Another process (P3) running on the ETL server is configured to perform data transformations (e.g., cleansing, summarizing) on the data received by P2. Yet another process (P4) executing on the ETL server is configured to receive the transformed data from process P3 and pass the data to a process P5 (e.g., database server process) executing on the target data source. Process P5 is then configured to write the data to the file system on the active target data store. A master ETL process (P0), running on the ETL server, is responsible for synchronizing the various processes in the overall ETL operation. Accordingly, in conventional ETL systems, the various processes have to be all executed simultaneously with one master process synchronizing the processes. This involves managing multiple data flows and control signals to achieve the synchronization of the data flow, error handling, logging, etc. The computing and network resources available to these processes, and also the speeds at which the prior and successor processes can process data govern the speed of the overall ETL operation. As a result, the entire ETL system runs only as fast as the slowest link in the process chain. If any of the processes error out, this information needs to be captured and other processes stopped appropriately.

The traditional ETL process architecture described above may be summarized as follows:

Active source data store→LAN→ETL Server→LAN→Active target data store

As is evident from the above, in traditional ETL processing the processing is performed by at least three different entities: at the source data, by the ETL server, and at the target data store. This traditional ETL architecture generally works acceptably when the active source data store, the ETL server, and the target data store are all connected together on the same high-speed LAN or server. However, problems arise when these traditional components are connected over a WAN such as via the Internet, as is needed for using a SaaS model. This is because, in a SaaS environment, the various processes involved in the ETL process sets would need to run on different servers, which could be geographically remote from each other, and which may be connected over slow WAN connections. Data and control signal flows between the active source data store and the ETL server and between the ETL server and the target data store would happen over potentially slow WANs. This is further aggravated by the "active" nature of the data sources that adds additional processing time to the data access operations. As a result, the entire ETL operation would take a very long time to complete. Further, since the processes have to be synchronized, operations over WANs would adversely impact the synchronization and cause further processing delays. For example, data throughputs of 900 records per second, when an ETL process is done over a LAN could slow down to less than 50 records per second when done over a WAN. Such performance degradations prevent SaaS-BI vendors from offering satisfactory SLAs to consumers. This, in turn, makes traditional ETL architectures unfeasible for a standalone SaaS-BI offering with today's state of the art in networking, storage, and processor technology.

Presently, there is no clear technological solution to the problem of performing ETL over WAN in order to provide ETL services via a SaaS model. A small number of companies are struggling to solve this problem in an ad-hoc manner using proprietary and invasive agent-based techniques. Such offerings are however not scalable and are expensive. Further, these agent-based techniques use a pull-based paradigm wherein the data from the consumers is pulled by the SaaS vendor. As a result, the consumers of the services that are the providers of data have very little control over how and when data is provided to the SaaS vendor. This in turn makes conventional offerings undesirable for consumers. These problems pose a formidable barrier to entry for BI vendors, including Oracle, from entering the multi-billion dollar SaaS-BI solution space.

BRIEF SUMMARY OF THE INVENTION

Embodiments of the present invention provide techniques that enable data extraction, transfer, and load (ETL) operations to be performed asynchronously over communication networks including a Wide Area Network (WAN).

According to an embodiment of the present invention, techniques are provided for communicating data from a source data store to a target data store. Data may be extracted at the source data store. The extracted data may then be pushed from the source data store to the target data store. At the target data store, one or more transformations may be performed on the data received from the source data store. The data received from the source data store may be loaded at the target data store. In one embodiment, the extraction of first data at the source data store, the communication of the first data to the target data store, the performance of one or more transformations, and the loading of the first data are performed asynchronously.

In one embodiment, the source data store is configured to create a transportable storage unit that stores the extracted data. As part of creating the transportable storage unit, the extracted data may be made read-only to preserve the integrity of the data. The transportable storage unit is then communicated from the source data store to the target data store over a communication network. The communication network may be a WAN.

Different protocols and techniques may be used to communicate the transportable storage unit from the source data store to the target data store including file transfer protocol, transportable tablespaces (e.g., as provided by Oracle databases), public key infrastructure for encryption, etc.

In one embodiment, the source data store may be part of an online transaction processing (OLTP) system and the target data store may be a data warehouse of a software as a service (SaaS) vendor.

The foregoing, together with other features and embodiments will become more apparent when referring to the following specification, claims, and accompanying drawings.

DETAILED DESCRIPTION OF THE INVENTION

In the following description, for the purposes of explanation, specific details are set forth in order to provide a thorough understanding of embodiments of the invention. However, it will be apparent that the invention may be practiced without these specific details.

Embodiments of the present invention provide techniques that enable data extraction, transfer, and load (ETL) operations to be performed asynchronously over communication networks including a Wide Area Network (WAN). An ETL system is configured to extract data from a source data store, perform transformations on the data and load the data into a target data store. In one embodiment, an ETL system (includes an ELT system) may be configured to perform the transformation operations before the load operation. In another embodiment, the ETL system may be configured to perform the transformation operations after the load operation. In yet another embodiment, the transformation operations may be performed both before and after the load operation.

Figure 1:
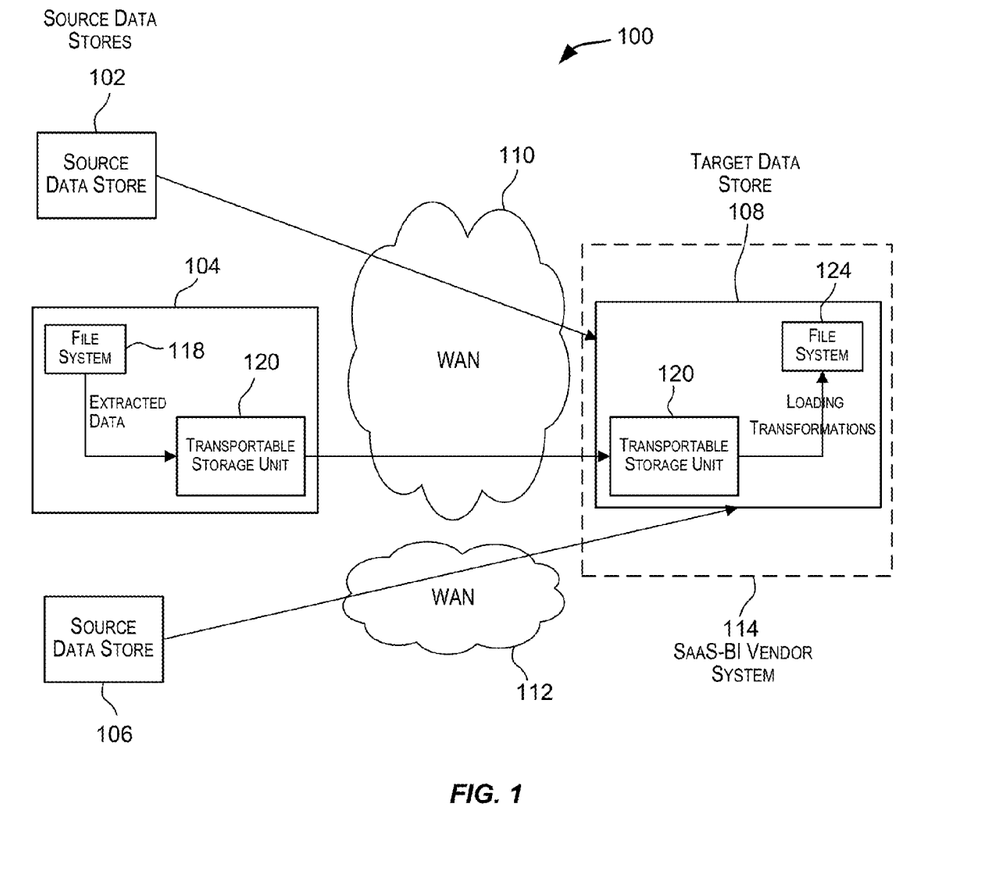
FIG. 1 is a simplified block diagram of a system incorporating an embodiment of the present invention.

FIG. 1 is a simplified block diagram of a system 100 incorporating an embodiment of the present invention. System 100 comprises a number of source data store systems 102, 104, 106 coupled to a target data store system 108 via one or more wide area networks (WAN) 110 and 112. The source data stores may be coupled to the target data store via a common WAN (e.g., source data stores 102 and 104 are coupled to target data store via WAN 110) or different WANs (e.g., source data store 106 is coupled to target data store 108 via a different WAN 112). The WANs 110 and 112 may be of different types including the Internet. Different communication protocols may be used to communicate data over the WANs. The WANs may use wired or wireless links to communicate the data. In alternative embodiments, other communication networks other than WANs may also be used to couple source data stores to a target data store.

As depicted in FIG. 1, the source data stores and target data store 108 may have file systems 118, 124 respectively storing data. File systems 118 and 124 may store data in the form of files, databases, etc. Data stores 102, 106, and 108 are typically active data stores. An active data store is a data store in which data stored by the data store is accessible to a consumer of the data only through one or more software layers or processes provided by the data source for managing and controlling access to the data stored by the data store. The software layer or processes may provide APIs for performing data-related functions such as performing input/output of the stored data, data aggregation functions, sorting functions, data correlation functions, and the like. A consumer of the data has to use these APIs for performing data-related functions. For example, a data store may provide a SQL software layer that provides SQL interfaces for accessing and manipulating the stored data. A user wishing to access the data has to use services or APIs provided by the SQL layer for the data access. The software layer may include a POSIX layer that provided APIs for accessing the stored data. In one embodiment, the POSIX layer may lie below the SQL layer. As another example, a Web services layer may be provided exposing APIs to a user that may be used by the user for accessing the stored data.

The source data stores and the target data stores can be on different platforms. For example, source data store 104 and target data store 108 may have different operating systems, databases from different vendors, different versions of databases, etc.

In one embodiment, data stores 102, 104, and 106 may be part of online transaction processing (OLTP) systems storing transaction data and target data store 108 may be part of a vendor system 114 providing BI services via a Software as a Service (SaaS) model. A business user of an OLTP system (e.g., system 104) may subscribe to services provided by the SaaS-BI vendor. A single SaaS-BI vendor system 114 may provide SaaS-BI services for multiple consumers (e.g., multiple OLTP systems). For example, each of source data stores 102, 104, and 106 may represent an OLTP consumer of services provided by SaaS-BI vendor system 114.

Embodiments of the present invention provide techniques for extracting data from a source data store, transforming the data, and loading the data into a target data store that may be connected to the source data store via communication network including a WAN. Embodiments of the present invention enable the extract, load, and transform operations to be performed asynchronously. An embodiment may be configured to extract data from source data stores 102, 104, and 106, perform transformations on the data, and load the data into target data store 108 where the extract, transformation, and load operations are all performed asynchronously. An embodiment of the present invention has been described below that is configured to extract data from data store 104 and load the data into target data store 108.

As depicted in FIG. 1, data to be communicated from source data store 104 to target data store 108 is extracted from a file system 118 of source data store 104 and stored as a transportable storage unit 120. Transportable storage unit 120 is then communicated from source data store 104 to target data store 108. In one embodiment, the data may be encrypted for security purposes prior to the date being communicated to target data store 108.

In one embodiment, the tasks of extracting data from source data store 104, creating transportable storage unit 120, and communicating unit 120 from source data store 104 to target data store 108 may be performed asynchronously by one or more processes executing locally to source data store 104. For purposes of this application, a process is considered to be executing locally to source data store 104 if the process executes on the same server or system as source data store 104 or on a system that is connected to source data store 104 via a local area network (LAN).

Transportable storage unit 120, which comprises the data to be communicated to target data store 108, is communicated from source data store 104 to target data store 108 using a push paradigm. Each source data store thus has control over when and what data is communicated to target data store 108. The data may be communicated over one or more communication networks that may include a wide area network (WAN), as depicted in FIG. 1, or other networks. Examples of communication networks over which the data may be communicated include radio networks, wifi networks, satellite links, and others.

The data communicated from source data store 104 is received by target data store 108 in the form of a transportable storage unit 120. The received data is then loaded into a file system 124 of target data store 108. For example, the data may be loaded into a database such as a data warehouse table. One or more transformations may be performed on the data prior to or after loading the data into file system 124. If the received data is secured, e.g., encrypted, the data may be decrypted prior to transformation and loading operations. The data is then available for analytics and other BI services offered by the SaaS-BI vendor.

The tasks of receiving, transforming, and loading the data into file system 124 of target data store 108 may be performed asynchronously by one or more processes executing locally to target data store 108. For purposes of this application, a process is considered to be executing locally to target data store 108 if the process executes on the same system/server as target data store 108 or on a system that is connected to target data store 108 via a local area network (LAN). Further details related to processing performed by processes local to target data store 108 are provided below.

As depicted in FIG. 1 and described above, data extracted from a source data store 104 is communicated to target data store 108 in the form of a transportable storage unit. Multiple such transportable storage units may be communicated from the same or multiple source data stores to target data store 108. The target data store may then perform transformation and load operations on the data contained in the various transportable storage units received from one or more source data stores. Target data store 108 thus provides a centralized hub for receiving data received from multiple sources. The ETL architecture depicted in FIG. 1 thus provides a hub-and-spoke model for performing ETL operations with the target data store representing the hub. Target data store 108 thus provides a centralized hub providing SaaS-BI services for multiple consumers.

Figure 2:
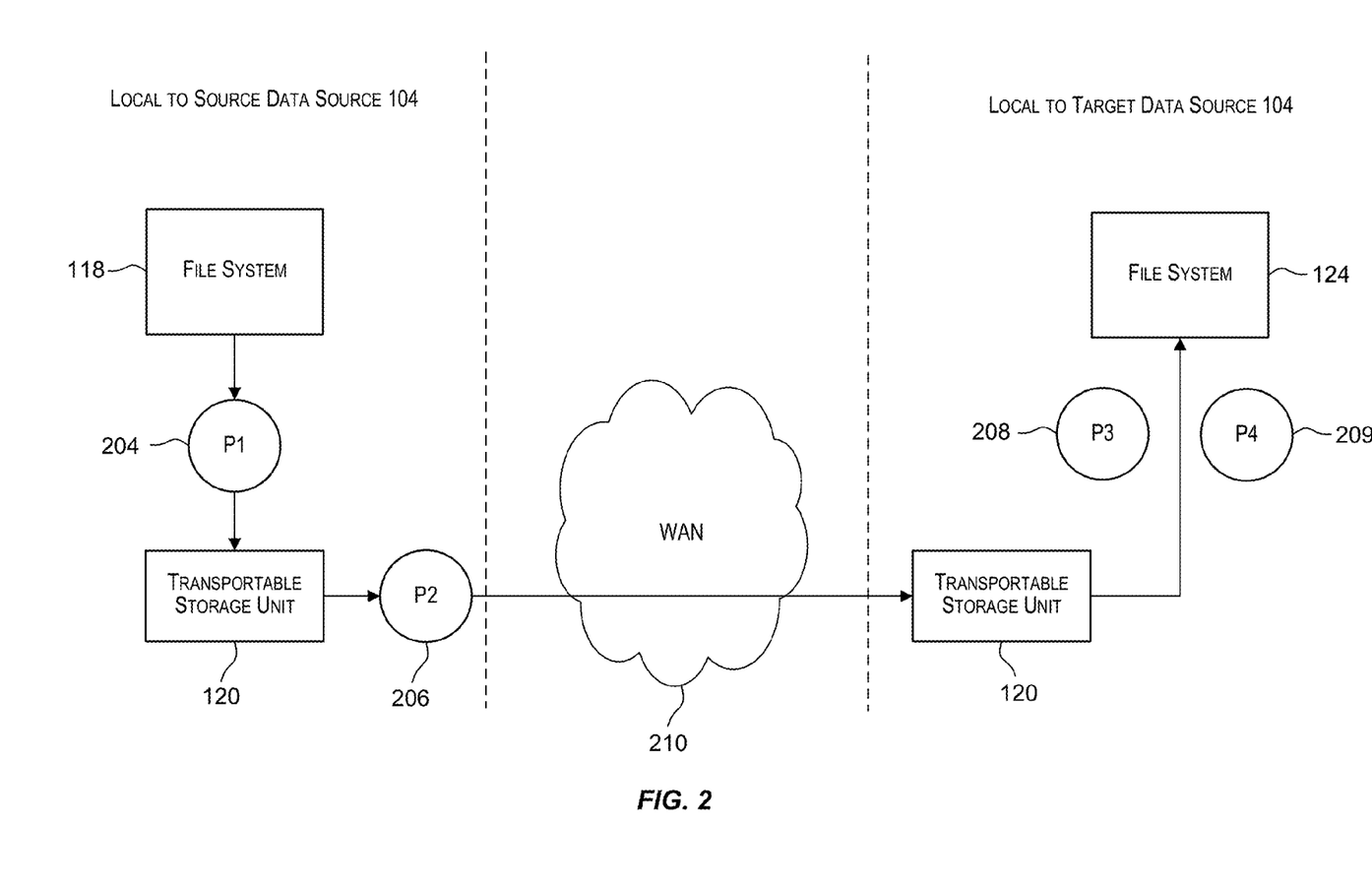
FIG. 2 is a simplified block diagram of processes responsible for performing ETL operations over a WAN according to an embodiment of the present invention.

FIG. 2 is a simplified block diagram of processes responsible for performing ETL operations over a WAN according to an embodiment of the present invention. The processes and processing depicted in FIG. 2 are not intended to limit the scope of the present invention as recited in the claims. For example, in alternative embodiments, the tasks performed by a single process depicted in FIG. 2 may be performed by separate processes. Likewise, multiple processes depicted in FIG. 2 may be combined into a single process in alternative embodiments.

As depicted in FIG. 2, the processes include one or more processes executing locally to source data store 104 and one or more processes executing locally to target data store 108. In the embodiment depicted in FIG. 2, the one or more processes executing locally to source data store 104 include a process P1 204 and a process P2 206. Process P3 208 and P4 209 execute locally to target data store 108. Processes P1 and P2 may execute on the same system/server as source data store 104 or on a system or device connected to source data store 104 via a LAN. Process P3 and P4 may execute on the same system or server as target data store 104 or on a system or device connected to target data store 108 via a LAN. The embodiment depicted in FIG. 2 accomplishes the ETL data transfer from a source data store to a target data store using four processes, namely, P1, P2, P3, and P4. The processes enable ETL operations to be performed asynchronously.

Process P1 is configured to perform extract operations. Process P1 is configured to extract data to be communicated to target data store 108 from file system 118 on source data store 104. Although, FIG. 2 shows a single process performing extraction operations, in an alternative embodiment, multiple sub-processes may be involved in performing extraction operations. Process P1 is configured to prepare a transportable storage unit 120 comprising the data to be communicated to target data store 108. Process P1 is configured to extract the data to be communicated from file system 118 on source data store 104 and store the extracted data as a separate storage unit. Examples of a separate storage unit include one or more files, a database, a portion of a database such as a tablespace, etc. The separate storage unit may be stored on source data store 104 itself or in a location that is local (e.g., connected via a LAN) to source data store 104. In one embodiment, the separate storage unit may be stored in a section (e.g., different partition or file system) of source data store 104.

Process P1 may make the separate storage unit read-only to ensure that the integrity of the data stored by the storage unit is not compromised prior to transfer of the data to the target data store and integration of the data into target data store 108. This may be done in one embodiment by making the separate storage unit offline from file system 118 on source data store 104. In one embodiment, the concept of transportable tablespaces provided by Oracle databases may also be used to create a separate storage unit.

Process P1 is also configured to make the separate storage unit transportable. In one embodiment, making a storage unit transportable includes making changes to the format of the data in the separate storage unit such that the data can be transported from source data store 104 to target data store 108 and the data format is understandable by the application on target data store 108 that will be using the data such that the data can be easily integrated with the application data on target data store 108. The transportable data is typically self-contained, in that all information needed to interpret the data (such as context information, metadata, etc.) is available on the separate storage unit itself. Examples of applications on target data store 108 that may use the data include a database, a data warehouse, and other applications.

In order to make the storage unit transportable such that it can be transported from source data store 104 to target data store 108, processing performed by process P1 may include: (1) based upon the communication capacity between source data store 104 and target data store 108, the data to be transported may be broken down into chunks that can be transported using the available communication capacity; (2) setting/changing the permissions/privileges associated with the data to ensure that communication of the data is permitted; (3) changing the format of the data (e.g., binary to ASCII, table format to file format, etc.); or (4) changing the content of the data (e.g., consolidation of duplicate data, etc.).

In one embodiment, the storage unit is made transportable such that it is capable of being transferred from source data store 104 to target data store 108 at a low cost and at high speed. This may involve checking the size of the storage unit that is to be communicated from source data store 104 to target data store 108, checking permissions associated with the data stored by the storage unit, and the like. For example, if only up to 5 Gigabytes of data can be transferred from source data store 104 to target data store 108 at a low cost and high speed, and the total size of the data in the storage unit to be transferred is 8 Gigabytes, then the storage unit may be broken into two transportable storage units of for example 5 Gigabytes and 3 Gigabytes. The access permissions associated with the data may be adjusted such that they do not hinder the communication of the storage unit from source data store 104 to target data store 108. Examples of transportable storage units include text or binary files on local or networked storage devices that have encryption capabilities, data-structures in the system memory, tablespaces, and the like.

Process P1 may also be configured to encrypt the data to be communicated to target data store 108 to secure the data. For example, the data stored in storage unit 120 may be encrypted by process P1 using a public-key encryption algorithm or other encryption technique.

Accordingly, in one embodiment, as described above, preparation of transportable storage unit 120 comprises several tasks including extracting the data to be transported to target data store 108 and storing it as a separate storage unit, making the storage unit read-only, making the storage unit transportable, and possibly encrypting the data stored on the storage unit to make it secure. In one embodiment, as depicted in FIG. 2 and described above, these tasks are performed by process P1 executing locally to source data store 104.

Examples of editable versus read-only storage units and transportable versus non-transportable storage units are provided in Table A.

TABLE A

| | Editable | Read-only |
|---|---|---|
| Transportable | Electronic database. OS file access through Web-service API. | Simple text file, having read permissions. Transportable table space (Oracle database concept). |
| Non-Transportable | Data generated "too quickly" in real time: Random data that is generated faster than network speeds, using a faster system clock. | File without read permissions or encrypted file with a lost secret key. Files, which contain suspicious data packets, which routers will block. |

TABLE A-continued

| Editable | Read-only |
| --- | --- |
| Data is too large to push through existing network connection. | |

Process P2 is configured to transport storage unit 120 prepared by process P1 from source data store 104 to target data store 108 over a communication network 210. Communication network 210 may be a WAN, as depicted in FIG. 2. In one embodiment, an efficient file transfer protocol, possibly with added security features, may be used for communicating transportable storage unit 120 from source data store 104 to target data store 108. Examples of transfer protocols that may be used include file transfer protocol (FTP), transportable table spaces, and the like. The data is communicated from source data store 104 to target data store 108 without requiring an intermediary server for synchronizing the communication as in traditional ETL techniques.

A secure communication channel may be used for enhanced data security. For example, a secure channel established using public key infrastructure, may be used to communicate transportable storage unit 120 from source data store 104 to target data store 108.

In one embodiment, a push paradigm is used to communicate transportable storage unit 120 from source data store 104 to target data store 108. According to this paradigm, process P2 pushes the transportable storage unit from source data store 104 to target data store 108. In this manner, process P2 executing on a source data store controls when and what data is pushed to target data store 108. Using a push paradigm for data communication enables the provider of the data (e.g., an OLTP system providing the data) to have control over when and what data is communicated to target data store 108 (or communicated to the SaaS-BI vendor). This is preferred by consumers of SaaS-BI services over traditional ETL architectures that use pull-based paradigms. The push-based paradigm avoids problems associated with pull-based paradigms used by agent-based systems in conventional ETL architectures where the SaaS vendor controls the data communication.

Target data store 108 receives the transportable storage unit communicated from source data store 104. Transformation and loading operations are then performed on the data in the transportable storage unit on target data store 108. In one embodiment, a process P3 executing locally to target data store 108 is configured to receive transportable storage unit 120 and load the data from the storage unit into a file system 124 of target data store 108. File system 124 may be for example a data warehouse or a data mart that is used for storing data for BI analysis. As part of the processing, process P3 is configured to make the storage unit 120 editable (i.e., read-writable). In one embodiment, this is done by making the storage unit part of file system 124 on target data store 108. In another embodiment, this may be done by updating metadata associated with storage unit 120. For example, if the storage unit is a tablespace, process P3 may make the tablespace readable and writeable and part of file system 124.

In one embodiment, transportable storage unit 120 may be received by target data store 108 from a secure channel. If the received data is encrypted, process P3 may be configured to decrypt the data prior to loading the data into file system 124.

Transformation operations may be performed prior to loading the data into file system 124 or after the data has been loaded into file system 124. In some embodiments, some transformation operations may be performed prior to the loading while others may be performed after the loading. In the embodiment depicted in FIG. 2, process P4 209 is configured to perform transformation operations. The loading and transformation operations are performed asynchronously. After the loading and transformation operations are completed, the data is then made available for analytics and other BI services offered by the SaaS-BI vendor.

Using the architecture depicted in FIGS. 1 and 2, the extract, load, and transformation operations can be performed asynchronously. This implies that the extraction, transformation, and load operations can be performed independently of each other and do not have to be synchronized. Further, the processing performed on source data store 104 can be performed asynchronously from the processing performed on target data store 108. Accordingly, the processing performed on source data store 104 is not dependent upon and does not have to be synchronized with processing performed on target data store 108. Likewise, processing performed on target data store 108 is not dependent upon and does not have to be synchronized with processing performed on source data store 104. This is achieved by using a transportable storage unit to transfer the data from source data store 104 to target data store 108. As a result of the asynchronous architecture, there is no need for synchronizing the various operations as in conventional ETL architectures. As a result, there is no need for a master process for synchronizing the various operations as in traditional ETL architectures. This in turn enables ETL to be performed over a WAN (or WWW) without performance degradation. For example, an ETL process in a source hardware server in one geo-location no longer has to wait for an ETL process in a target server in another geo-location. This decouples the two processes in a spatial as well as temporal sense, which allows them to be executed asynchronously over a WAN.

As indicated above, in one embodiment, the concept of tablespaces provided by Oracle databases may be used to transfer data from source data store 104 to target data store 108. A database, such as an Oracle database, is divided into one or more logical pieces known as tablespaces. A tablespace is used to logically group data together. For example, one tablespace may be created for accounting and a separate tablespace for purchasing, etc. A tablespace consists of one or more data files. The transportable tablespaces feature, for example as provided by Oracle databases, enables a subset of an Oracle database to be removed from one Oracle database and plugged into another Oracle database, essentially moving tablespaces between the databases. This feature is typically used for fast replication/backup of data and is also available in databases provided by other vendors in various forms. Moving data using transportable tablespaces is generally much faster than performing either an export/import or unload/load of the same data, because transporting a tablespace only requires the copying of data files and integrating the tablespace structural information. Transportable tablespaces may also be used to move index data, thereby avoiding the index rebuilds that would have to be performed when importing or loading table data.

In one embodiment, the data to be transferred from source data store 104 to target data store 108 may be extracted from source data store 104 and stored as a separate tablespace. The tablespace may then be switched to read-only mode. The read-only tablespace represents a transportable storage unit. The database file that stores the read only tablespace is then copied into target data store 108 and then activated by converting it to read-write mode. The data stored by the tablespace on the target system is now available either for further processing or for direct use by BI applications.

Moving data using transportable tablespaces can be much faster than performing either an export/import or unload/load of the same data. This is because transporting a tablespace only requires the copying of data files and integrating the tablespace structural information. Transportable tablespaces may be used to move both table and index data, thereby avoiding the index rebuilds that have to be performed when importing or loading table data into a database. Further, using tablespaces to transfer the data avoids the 3-step commit typically associated with a normal database write operation. This provides significant benefits in the terms of the time needed to write the data to the target data store database. Further, tablespaces may be used to transport data even when the source data store and the target data store are on different platforms (e.g., with different operating systems, databases from different vendors, different versions of databases, etc.). Other techniques for creating a transportable data unit may also be used in alternative embodiments.

Figure 3:
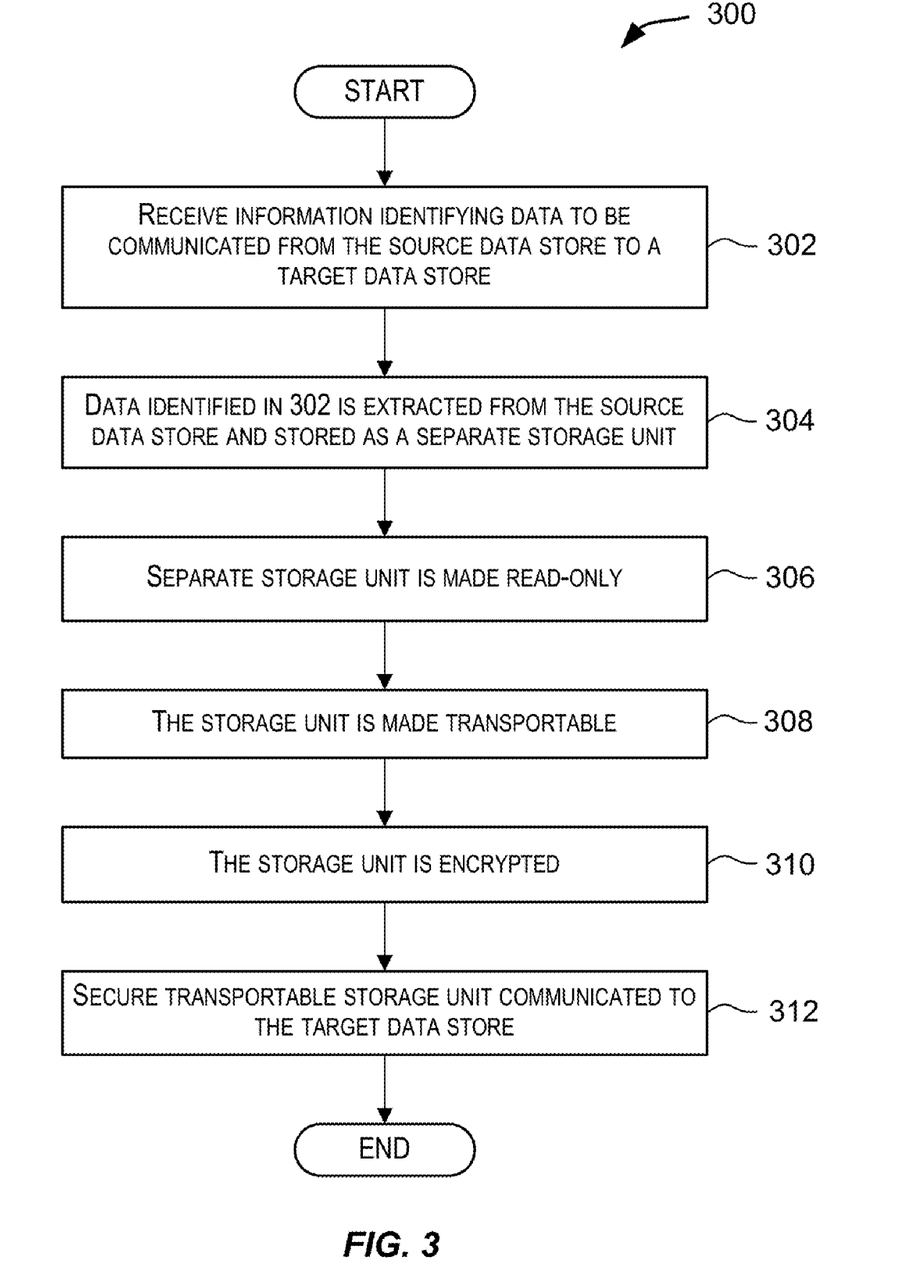
FIG. 3 is a simplified flow chart depicting a method performed locally at a source data store for communicating data from a source data store to a target data store according to an embodiment of the present invention.

FIG. 3 is a simplified flow chart 300 depicting a method performed locally at a source data store for communicating data from a source data store to a target data store according to an embodiment of the present invention. The method may be performed by software (e.g., program, code, instructions) executed by a processor, hardware, or combinations thereof. The software may be stored on a computer-readable storage medium. In one embodiment, the method may be performed by processes executing locally to source data store 104.

As depicted in FIG. 3, information is received identifying data to be communicated from source data store 104 to target data store 108 (step 302). In one embodiment, a query may be received in 302, where the query represents data to be communicated to target data store 108. In another embodiment, the information to be communicated may be received in 302.

The data identified in 302 is then extracted from the source data store and stored as a separate storage unit (step 304). For example, if a query is received in 302, the query is executed and the resultant data extracted from source data store 104 and stored as a separate storage unit. The separate storage unit may take various forms including one or more files, a database, a portion of a database such as a tablespace, etc. The separate storage unit may be stored in a section (e.g., different partition or file system) of source data store 104. In one embodiment, a copy is made of the data identified for extraction and the copy is stored as a separate storage unit such as a separate data file.

The separate storage unit is then made read-only (step 306). This is done to ensure that the integrity of the data stored by the separate storage unit is not compromised prior to communication of the data to target data store 108. In one embodiment, this may be done by making the separate storage unit offline from the file system on the target data store 108 such that the data stored by the separate storage unit cannot be changed. In another embodiment, metadata associated with the storage unit may be updated to make the data read-only. Various other techniques may also be used to make the data read-only.

The separate storage unit is made transportable (step 308). As previously described, making a storage unit transportable includes making any changes to the format of the data in the separate storage unit such that the data can be transported from source data store 104 to target data store 108 and the data format is understandable by the application on target data store 108 thereby enabling the data to be easily integrated with the data of the application. For example, if the data communicated to target data store 108 is to be stored in a database, then as part of 308, processing may be performed to change the data in the separate storage unit such that the data can be easily integrated into the database. The transportable data is typically self-contained, in that all information to interpret the data (such as context information, metadata, etc.) in the separate storage unit is available on the separate storage unit. Examples of applications on target data store 108 that may use the data include a database, a data warehouse, and other applications.

As described above, the processing in step 308 is performed by source data store 104. In an alternative embodiment, the processing may be performed, in whole or in part, by another component remote from the source data store 104. Part of the processing performed in 308 may also be performed on target data store 108.

Optionally, the data in the separate storage unit may be encrypted to secure the data during communication to target data store 108 (step 310). Although shown as a separate step 310 in FIG. 3, the data may be encrypted during steps 306 and/or 308.

The secure transportable storage unit is then communicated from the source data store to the target data store 108 (step 312). Various different protocols may be used for the transfer such as FTP, transportable data spaces, and the like. In one embodiment, a push paradigm is used to transfer the transportable storage unit from the source data store to the target data store. A secure communication channel may be used to communicate the transportable storage unit from the source data store to the target data store.

In one embodiment, some transformations may also be performed on the data on source data store 104. These transformations may be performed as part of steps 306, 308, and/or 310.

Figure 4:
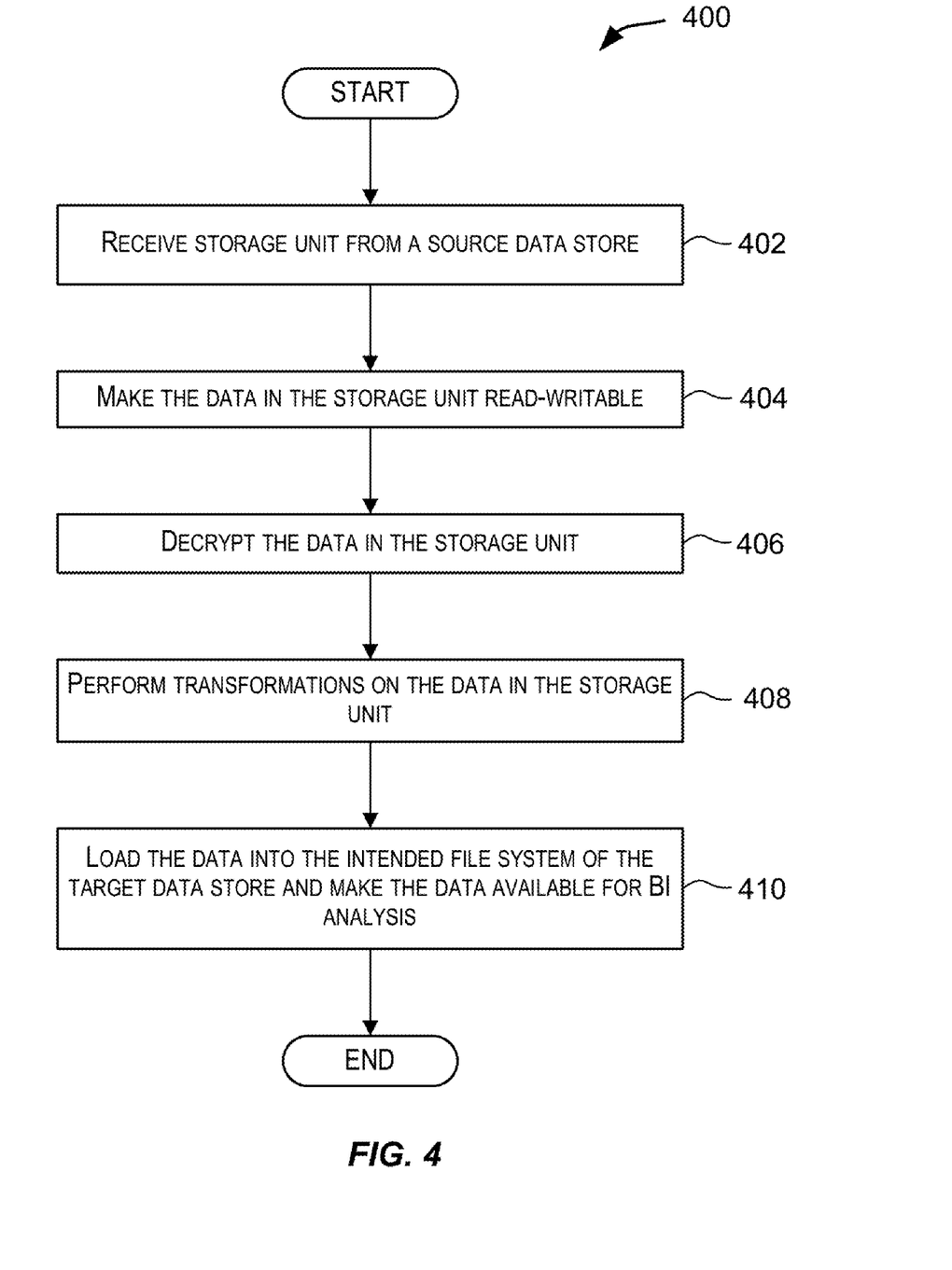
FIG. 4 is a simplified flow chart depicting a method performed locally at a target data store for loading data received from a source data store according to an embodiment of the present invention.

FIG. 4 is a simplified flow chart 400 depicting a method performed locally at a target data store for loading data received from a source data store according to an embodiment of the present invention. The method may be performed by software (e.g., program, code, instructions) executed by a processor, hardware, or combinations thereof. The software may be stored on a computer-readable storage medium. In one embodiment, the method may be performed by processes executing locally to target data store 108.

As depicted in FIG. 4, a storage unit is received from a source data store (step 402). The storage unit may be received over a secure channel.

The storage unit is then made read-writable (or editable) (step 404). In one embodiment, this may be done by making the storage unit part of file system 124 on target data store 108. In one embodiment, this may be done by updating metadata associated with the storage unit such that the data in the storage unit is made editable. If the data in the storage unit is encrypted (or secured in some manner), then the data may be decrypted (step 406). One or more transformations may be performed on the decrypted data (step 408). The data may then be loaded into the intended file system of the target data store and made available for BI analysis (step 410). The intended file system may be for example a data warehouse or a database on target data store 108. The processing done in the various steps depicted in FIG. 4 and described above may be performed asynchronously.

In the embodiment depicted in FIG. 4 and described above, the transformation operations are performed in 408 and the load operations are performed in 410. In an alternative embodiment, the data from the storage unit may be first loaded into the intended file system of the target data store and then transformation operations may be performed on the loaded data. Alternatively, some transformation operations may be performed prior to loading the data while others may be performed after the data has been loaded.

The transformation and load operations performed on the target data store may be performed asynchronously. This implies that the time when the load operation is performed is independent from when the transformation operation is performed. Unlike conventional ETL architectures, the load and transformation operations do not have to be performed synchronously.

As described above, embodiments of the present invention enable ETL operations to be performed in an asynchronous manner. This implies that the extraction, transformation, and load operations can be performed independently of each other and do not have to be synchronized. Further, the processing performed on source data store 104 is not dependent upon and does not have to be synchronized with processing performed on target data store 108. Likewise, processing performed on target data store 108 is not dependent upon and does not have to be synchronized with processing performed on source data store 104. The processing of data in the source and target data stores no longer has to be done in an orchestrated manner as in conventional ETL architectures. For example, an ETL process in a source hardware server in one geo-location no longer has to wait for an ETL process in a target server in another geo-location. This decouples the two processes in a spatial as well as temporal sense, which allows them to be executed asynchronously.

By transporting data from the source data store to the target data store in the form of transportable storage units, embodiments of the present invention use an asynchronous ETL architecture simplifying the overall ETL architecture. As a result, the amount of synchronization needed for the asynchronous architecture between the processes performing the operations is a lot less than the synchronization needed between processes in traditional synchronous ETL solutions. The number of processes used for implementing the secure asynchronous ETL architecture is also less than the several processes needed for the traditional synchronous model. This makes it easier to isolate processing tiers in production, simplify diagnosis and error recovery, debug problems, provide for high availability, and resolve performance bottlenecks. This makes the entire ETL architecture more fault tolerant.

The asynchronous nature of ETL-related operations also enables each operation to be optimized independently without having to worry about its dependence on other operations. For example, an ETL system administrator may optimize each operation independently. As a result, each of the ETL operations and also the communication of the transportable storage unit from the source data store to the target data store may be performed when best suited to perform that operation. For example, using embodiments of the present invention, the communication of the data from a source to a target may be scheduled when the cost for data communication is low and the necessary bandwidth is available for the communication without having to worry about the other operations involved in the ETL process. The performance of the entire ETL process can thus be easily fine-tuned and improved. This makes the ETL model very scalable to handle large amounts of data. Embodiments of the present invention thus provide a differential or incremental ETL model as opposed to monolithic ETL performed by conventional ETL architectures.

The ability to optimize each ETL task separately, especially communication of the data from the source data store to the target data store, is beneficial in several different industries or domains such as (a) in offshore oil platforms where data collected/generated at the oil platforms has to be communicated to a land-based central operation using limited network bandwidth, (b) in aerospace or space applications where communications (e.g., from the NASA Mars Explorer, from the International Space Station) can only be performed within a limited time window; (c) in any business wherein data has to be communicated from several remote locations to a centralized location, (d) others.

By making the ETL operations asynchronous, embodiments of the present invention enable delivery of BI applications involving ETL capability to be provided via a SaaS-BI model using a subscription model. The hub-and-spoke ETL architecture according to an embodiment of the present invention is well suited for offering BI services via a SaaS model wherein the consumers of the services may be geographically remote form each other and also from the SaaS-BI vendor. A consumer may be connected to the SaaS-BI vendor via different communication networks including LANs, WANs, and the like. The high performance enabled by embodiments of the present invention, even over a WAN, enable SaaS-BI vendors to offer consumers service level agreements (SLAs) that ensure a specified level of performance and availability of the software services to the consumers. Being able to use a SaaS model for ETL operations provides significant cost savings to the consumer. Embodiments of the present invention will help drive the adoption of BI applications over a SaaS model.

Using an embodiment of the present invention, BI vendors can deliver software services through the SaaS model without having to resort to invasive agent-based technologies that are not preferred by consumers of the SaaS services. As described above, in embodiments of the present invention, a push model is used to transfer data from the data source to the data target, thus allowing the providers of the data to have complete control over what data is communicated to the SaaS vendor and when that data is pushed to the BI SaaS vendor. Controlling when and how data is communicated to a target data store, allows consumers of SaaS services to perform traffic shaping based upon network bandwidth availability and associated costs.

Further, traditional synchronous ETL techniques typically use interfaces such as net8, jdbc, odbc or other database connections to transfer data. Embodiments of the present invention use FTP, transportable tablespaces, and other data transfer protocols that are faster than the interfaces used by traditional synchronous techniques. A transportable storage unit is used to facilitate the communication. Additionally, embodiments of the present invention either read from or write to at-most one active data store and data is communicated as a transportable storage unit. This reduces the time spent in read-write operations and is different from traditional synchronous ETL techniques that read from and write to multiple active data stores (or active storage units), thereby slowing the data read and write process.

Due to the asynchronous nature of the operations, there is now no need for a separate ETL server to coordinate the various operations. This reduces the number of processes involved in ETL processing. This enables significant time savings in the transfer of data from a source data store to a target data store, especially over a WAN, over traditional synchronous techniques. Additionally, by reducing the number of processing nodes and network stages over which data has to traverse, and further by moving data over the network using transportable storage units, the performance provided by embodiments of the present invention is better than that of traditional architectures, even over a WAN. Embodiments of the present invention consume fewer network resources and computing resources since the target does not have to access data from a source over a network repeatedly; a majority of the time consuming ETL operations are performed locally, either at the source or the target. Due to a transportable storage unit being used to communicate data and decoupling of the processing performed by the source and the target, processors on one server, either the source or target server, do not have to access memory structures from the other server over a network and do not have to wait on processing done by the other server. This provides increased scalability as the amount of data being processed increases. Further, by using a more modular design, the asynchronous aspect of embodiments of the present invention enable isolation of each layer of processing from others. This provides for easier error recovery.

A Specific Implementation

In one embodiment, ETL was implemented over a 6.5 MBps broadband line, using SSL-VPN. The tests covered the uses case of performing ETL of a database table, w_gl_other_f, in cases where it contained varying amounts of data, ranging from approximately 100 MB to 10G. The table w_gl_other_f, used to store information about the general ledger used to maintain the financial books of a company, is one of the biggest tables in the Oracle BI application Datawarehouse.

The source and target tables were stored in Oracle database 11G. The machine used to store the warehouse ran on a Windows XP, Intel 1.83 GHz processor, and 1.99 GB RAM 987 MHz machine. The OLTP system was set up on a comparable or less powerful machine, and also ran Oracle database 11G. Synchronous traditional ETL was implemented using Informatica (Informatica version 7.1.4 was used). Asynchronous ETL per an embodiment of the present invention was implemented using Oracle Data Integrator (ODI) as the scripting engine and FTP was used to move data from the source data store to the target data store over a WAN (Internet). Filezilla was used as the FTP server. ODI 10G was used. The concept of tablespaces in the Oracle database was used to create transportable storage units. The results of the study are tabulated below and can be repeated on another comparable test setup. The results for FTP may be further improved by tuning the FTP protocol parameters such as block size.

Table B, shown below, depicts Results of Tests comparing ODI/FTP (embodiment of the invention) vs. Informatica (traditional ETL).

mance as compared to traditional ETL techniques. The increase in performance relative to traditional ETL techniques becomes even more pronounced as the size of the data involved in ETL operations increases. Embodiments of the present invention will provide even more dramatic increase in performance in real-life ETL operations involving very huge amounts of data.

Figure 5:
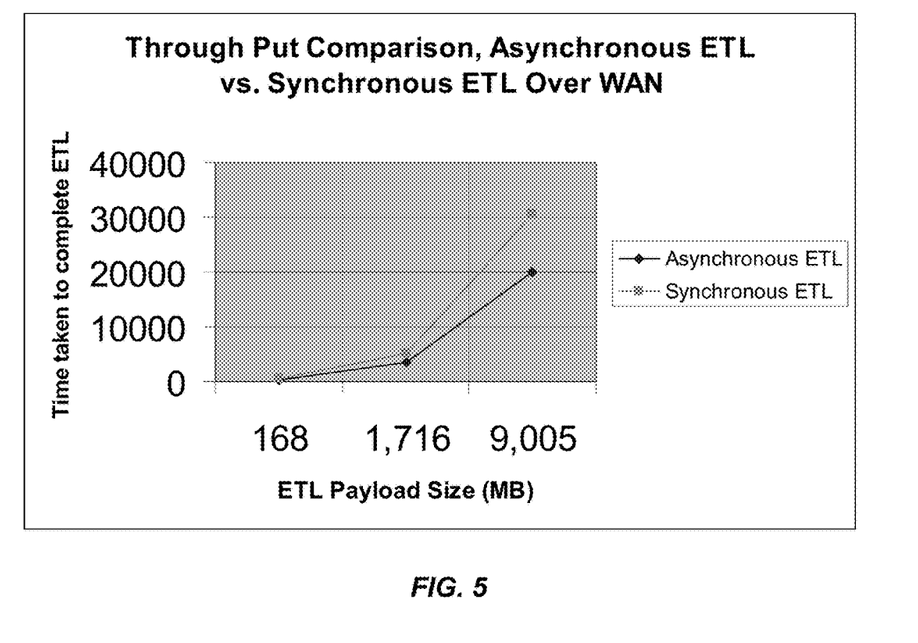
FIG. 5 depicts a graph depicting throughput comparison of an embodiment of the present invention using an asynchronous ETL architecture versus an ETL architecture using synchronous techniques.

FIG. 5 depicts a graph depicting throughput comparison of an embodiment of the present invention using an asynchronous ETL architecture versus an ETL architecture using synchronous techniques. For collecting the statistics depicted in FIG. 5, the asynchronous ETL was implemented using ODI/FTP and traditional synchronous ETL was implemented using Informatica for ETL over a WAN (in this case the World Wide Web). In FIG. 5, the X-axis depicts various payload sizes used for the ETL operations and the Y-axis depicts the time taken for completing the ETL operations.

As is evident from the graph depicted in FIG. 5, asynchronous ETL scales better than synchronous ETL over the World Wide Web. The divergence in performance between the two approaches is expected to be more dramatic with larger ETL payloads, amount of data that needs to be transmitted from source to target system. The size of the data shown in FIG. 5 is in the Gigabyte range. The benefits would be even more marked for larger sizes of data such as for data in the terabyte or even higher range.

Figure 6:
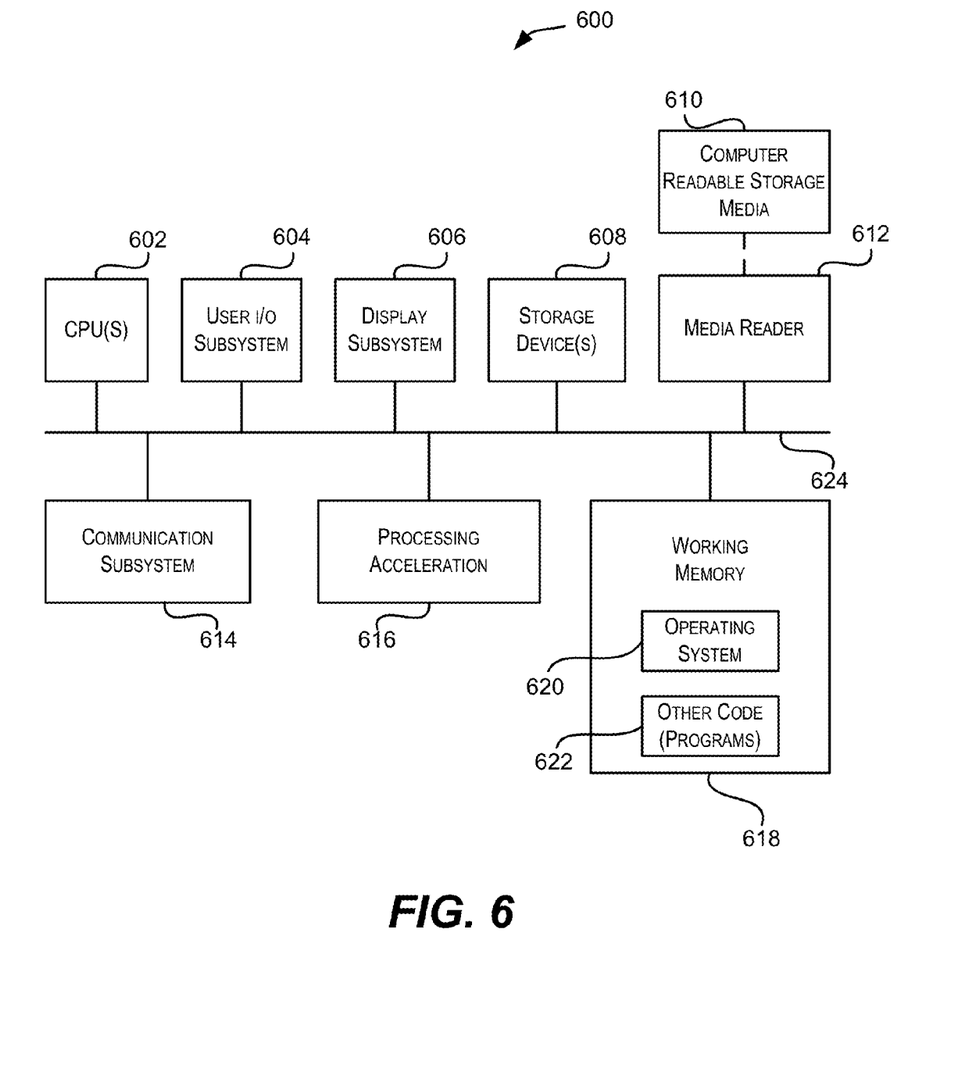
FIG. 6 is a simplified block diagram of a computer system that may be used in accordance with embodiments of the present invention.

FIG. 6 is a simplified block diagram of a computer system 600 that may be used in accordance with embodiments of the present invention. A system such as computer system 600 may be configured to perform processing at source data store 104. For example, computer system 600 may execute processes P1 and P2 depicted in FIG. 2. A system such as computer system 600 may also be configured to perform processing at target data store 108. For example, computer system 600 may execute process P3 depicted in FIG. 2.

Computer system 600 is shown comprising hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). Computer system 600 may also include one or more storage devices 608 that represent computer-readable storage memory. By way of example, the storage device(s) 608 may include devices such as disk drives, optical storage devices, and solid-state storage devices such as a random access memory (RAM) and/or a read-only memory (ROM), which can be programmable, flash-updateable and/or the like.

Computer system 600 may additionally include a computer-readable storage media reader 612, a communications subsystem 614 (e.g., a modem, a network card (wireless or wired), an infra-red communication device, etc.), and working memory 618, which may include RAM and ROM devices

TABLE B

| Number of Rows in table | File size (MB) | Time taken to complete ETL (in seconds) | | ETL throughput (number of database records/second) | | ETL throughput (Mega Bytes/second) | |
|---|---|---|---|---|---|---|---|
| | | Asynchronous ETL | Synchronous ETL | Asynchronous ETL | Synchronous ETL | Asynchronous ETL | Synchronous ETL |
| 267,137 | 168 | 365 | 452 | 732 | 591 | 0.46 | 0.37 |
| 3,205,644 | 1,716 | 3,480 | 5,185 | 921 | 618 | 0.49 | 0.33 |
| 16,822,576 | 9,005 | 19,920 | 30,540 | 845 | 550 | 0.45 | 0.30 |

As can be seen from Table B, embodiments of the present invention provide a significant improvement in ETL perforas described above. In some embodiments, computer system 600 may also include a processing acceleration unit 616, which can include a digital signal processor (DSP), a special-purpose processor, and/or the like.

Computer-readable storage media reader 612 can further be connected to a computer-readable storage medium 610, together (and, optionally, in combination with storage device (s) 608) comprehensively representing remote, local, fixed, and/or removable storage devices plus storage media for temporarily and/or more permanently containing computer-readable information. Communications subsystem 614 may facilitate communication of data to and from computer system 600.

Computer system 600 may also comprise software elements, shown as being currently located within working memory 618, including an operating system 620 and/or other code 622, such as an application program (which may be a client application, Web browser, mid-tier application, RDBMS, etc.). In an exemplary embodiment, working memory 618 may include executable code, program, and associated data structures (such as caches) used for the pattern matching method described above. It should be appreciated that alternative embodiments of computer system 600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code or instructions, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer. The code, instructions, or programs may be executed by CPU 602.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A computer-readable non-transitory storage medium storing a plurality of instructions controlling one or more processors to facilitate communication of data from a source data store to a target data store, the plurality of instructions comprising:
    instructions that cause first data to be extracted by at least one first asynchronous process at the source data store;
    instructions that cause a first transportable storage unit to be created by the asynchronous process at the source data store, the first transportable storage unit comprising the first data;
    instructions that cause the first transportable storage unit to be broken up into at least a second transportable storage unit and a third transportable storage unit in response to a determination that a size of the first transportable storage unit will cause a transmission of the first transportable storage unit from the source data store to the target data store over a communication network to be performed at less than a specified threshold speed;
    instructions that cause the second transportable storage unit to be pushed by the asynchronous process at the source data store from the source data store to the target data store over the communication network;
    instructions that cause at least a portion of the first data to be extracted from the second transportable storage unit by at least one asynchronous process at the target data store;
    instructions that cause one or more transformations to be performed on said at least a portion of said first data by the asynchronous process at the target data store to generate transformed data; and
    instructions that cause the transformed data to be loaded at the target data store by the asynchronous process at the target data store.

2. The computer-readable non-transitory storage medium of claim 1 wherein the communication network is a wide area network (WAN).

3. The computer-readable non-transitory storage medium of claim 1 wherein the instructions that cause the first transportable storage unit to be created comprise:
    instructions that cause the first data to be made read-only.

4. The computer-readable non-transitory storage medium of claim 1 wherein the instructions that cause the second transportable storage unit to be communicated from the source data store to the target data store over the communication network comprise instructions that cause the second transportable storage unit to be communicated using a file transfer protocol (FTP).

5. The computer-readable non-transitory storage medium of claim 1 wherein the plurality of instructions further comprise:
    instructions that cause the first data to be made read-writable; and
    instructions that cause the transformed data to be loaded into a file system of the target data store.

6. The computer-readable non-transitory storage medium of claim 1 wherein the second transportable storage unit is a tablespace.

7. The computer-readable non-transitory storage medium of claim 1 wherein the source data store is part of an online transaction processing (OLTP) system and the target data store is a data warehouse of a software as a service (SaaS) vendor.

8. The computer-readable non-transitory storage medium of claim 1 wherein the transportable storage unit comprises a data structure.

9. The computer-readable non-transitory storage medium of claim 1 wherein the plurality of instructions further comprise:
instructions for causing the second transportable storage unit to contain all metadata that is needed for said at least one asynchronous process at the target data store to interpret said first data.

10. The computer-readable non-transitory storage medium of claim 1 wherein the plurality of instructions further comprise:
instructions for creating each of the second and third transportable storage units in sizes that enable each of the second and third transportable storage units to be transmittable over the communication network at no less than the specified threshold speed.

11. A system comprising:
a memory; and
a processor coupled to the memory, the processor configured to:
extract first data from the memory by at least one asynchronous process at a source data store;
create a first transportable storage unit comprising the first data by the asynchronous process at the source data store;
break up the first transportable storage unit into at least a second transportable storage unit and a third transportable storage unit in response to a determination that a size of the first transportable storage unit will cause a transmission of the first transportable storage unit from the source data store to the target data store over a communication network to be performed at less than a specified threshold speed; and
push the second transportable storage unit to a target data store over a communication network by at least one asynchronous process at the target data store, at least a portion of the first data being extracted from the second transportable storage unit at the target data store and transformed into transformed data by the asynchronous process at the target data store, the transformed data being loaded at the target data store by the asynchronous process at the target data store.

12. The system of claim 11 wherein the communication network is a wide area network (WAN).

13. The system of claim 11 wherein the processor is configured to make the first data read-only.

14. The system of claim 11 wherein the first protocol is configured to cause the second transportable storage unit to be pushed to a target data store using file transfer protocol (FTP).

15. The system of claim 11 wherein the second transportable storage unit is a tablespace.

16. The system of claim 11 wherein the processor is configured to:
extract the first data from the source data store and store it as a tablespace;
make the tablespace read only; and
copy the tablespace from the source data store to the target data store.

17. The system of claim 11 wherein the transportable storage unit comprises a data structure.

18. The system of claim 11 wherein the processor is configured to cause the second transportable storage unit to contain all metadata that is needed for said at least one asynchronous process at the target data store to interpret said first data.

19. The system of claim 11 wherein the processor is configured to create each of the second and third transportable storage units in sizes that enable each of the second and third transportable storage units to be transmittable over the communication network at no less than the specified threshold speed.

* * * * *

UNITED STATES PATENT AND TRADEMARK OFFICE
CERTIFICATE OF CORRECTION

PATENT NO. : 8,380,657 B2
APPLICATION NO. : 12/562326
DATED : February 19, 2013
INVENTOR(S) : Shaik et al.

It is certified that error appears in the above-identified patent and that said Letters Patent is hereby corrected as shown below:

On title page, in column 2, item (56) under "Other Publications", line 4, delete "Stamfod," and insert -- Stamford, --, therefor.

Signed and Sealed this
Fourteenth Day of May, 2013

Teresa Stanek Rea
*Acting Director of the United States Patent and Trademark Office*